(12) United States Patent
Shustack et al.

(10) Patent No.: US 6,656,990 B2
(45) Date of Patent: Dec. 2, 2003

(54) CURABLE HIGH REFRACTIVE INDEX COMPOSITIONS

(75) Inventors: Paul J. Shustack, Elmira, NY (US); Zhikai Wang, Roswell, GA (US)

(73) Assignee: Corning Incorporated, Corning, NY (US)

( * ) Notice: Subject to any disclaimer, the term of this patent is extended or adjusted under 35 U.S.C. 154(b) by 39 days.

(21) Appl. No.: 09/903,235

(22) Filed: Jul. 11, 2001

(65) Prior Publication Data

US 2003/0021566 A1 Jan. 30, 2003

(51) Int. Cl.[7] .............................. C08K 3/18; C08K 3/22
(52) U.S. Cl. ...................... 524/430; 524/404; 524/407
(58) Field of Search ................... 523/200, 212; 524/404, 407, 742, 430; 428/404, 407

(56) References Cited

U.S. PATENT DOCUMENTS

| 5,494,949 A | * | 2/1996 | Kinkel et al. ............... 523/212 |
| 6,194,481 B1 | * | 2/2001 | Furman et al. ............... 522/77 |
| 2001/0035929 A1 | * | 11/2001 | Nakamura et al. ........... 349/137 |
| 2002/0013382 A1 | * | 1/2002 | Furman et al. | |

FOREIGN PATENT DOCUMENTS

| EP | 1 054 035 | 11/2000 |
| JP | 59-81317 | 5/1984 |
| JP | 4-13763 | 1/1992 |
| JP | 12026773 | 1/2000 |
| JP | 2000-44811 | 2/2000 |
| WO | WO 95/02835 | 1/1995 |
| WO | WO 00/44830 | 8/2000 |
| WO | WO 01/01175 | 1/2001 |
| WO | WO 01/33289 | 5/2001 |

OTHER PUBLICATIONS

Y. Zhang et al. "Preparation and optical absorption of dispersions of nano–TiO2/MMA (methyl methacrylate) and nano–TiO2/PMMA (polymethyl methacrylate)", Materials Research Bulletin, vol. 34, No. 5, pp. 701–709 (1999).

* cited by examiner

*Primary Examiner*—Edward J. Cain
*Assistant Examiner*—Katarzyna Wyrozebski Lee
(74) *Attorney, Agent, or Firm*—James V. Suggs (57) ABSTRACT

The invention provides an organic/inorganic hybrid material with a high refractive index at telecommunications wavelengths. Energy curable compositions of the present invention include condensed metal oxide nanoparticles, a high refractive index organometallic coupling agent, an energy curable organometallic coupling agent, and a high refractive index monomer or oligomer. Polymeric materials of the present invention include condensed metal oxide nanoparticles having a mixture of organometallic coupling agents covalently bound to the exterior surface of the nanoparticles and a high refractive index solid polymer matrix, wherein the mixture of organometallic coupling agents includes a high refractive index coupling agent, and a coupling agent covalently bound to the polymer matrix. The materials of the present invention are useful in making optical devices for telecommunications applications.

24 Claims, 3 Drawing Sheets

Fig. 1

Energy Curable Formulation

↓ Cure

↓ Bake

Hybrid Material

R = pentachlorobenzyl
Rc = bromophenyl
Rl = -S-C$_6$H$_4$-S-C$_6$H$_4$-S-

CURABLE HIGH REFRACTIVE INDEX COMPOSITIONS

BACKGROUND OF THE INVENTION

1. Field of the Invention

The invention relates to curable organic-inorganic hybrid compositions having a high refractive index, methods of making and using such compositions, and polymeric materials and articles made from such compositions. The compositions of the present invention are useful in the field of fiber optic communications.

2. Description of Related Art

For many optical applications, high refractive index materials are desirable. Inorganic glasses and crystals, such as, for example, silicon nitride and lead borosilicate glasses, while high in refractive index, are difficult to process. For example, it is difficult and/or expensive to make planar waveguides from such materials. Polymers have recently drawn attention as a material for the low-cost fabrication of devices for optical communications. Standard optical polymers have a refractive index of between about 1.30 and about 1.60 at 1550 nm. For many applications, such as, for example, the liquid crystal cross-connect switch described in commonly owned and copending U.S. patent application Ser. No. 09/431,430, which is incorporated herein by reference, these refractive indices are simply too low.

Many efforts have been made to develop high refractive index organic-inorganic hybrid materials through the use of the sol-gel process. The inorganic species in these materials are, for example, titanium dioxide or zirconium dioxide. Although these hybrid materials are theoretically advantageous because of the high index, optical clarity and hardness of the inorganic portion, the sol-gel process can result in materials with a high hydroxyl content. The hydroxide functional group has a strong vibrational overtone at around 1550 nm. Thus, in order to be useful in optical communications, sol-gel derived materials must be substantially dehydroxylated. However, the process of conventional dehydroxylation, requires a high temperature treatment and can damage the organic portion of the material, and can create cracking problems in films thicker than five microns and in monolithic materials. This cracking is due to high capillary pressure and the stress induced by shrinkage from the removal of water and alcohol through condensation reactions and evaporation. Further, the shrinkage of these materials makes them unsuitable for use in polymer microreplication processes.

Another method for the incorporation of inorganics into processable polymer materials is the dispersion of pulverized titania particles in a resin binder. One disadvantage of this method is the aggregation and/or agglomeration of particles due to the hydrophilicity of the surfaces of the particles.

SUMMARY OF THE INVENTION

One aspect of the present invention relates to an energy curable composition including condensed high refractive index metal oxide nanoparticles; a high refractive index organometallic coupling agent; an energy curable organometallic coupling agent including an energy curable organic moiety; and a high refractive index energy curable monomer or oligomer.

Another aspect of the present invention relates to an energy curable composition wherein the high refractive index organometallic coupling agent has the formula $Rc_xR_yMQ_{4-x-y}$ where M is a metal atom selected from the group consisting of Si, Ti, Zr, and Sn, Rc is an organic moiety with a refractive index of at least about 1.52 at 1550 nm bound to the metal atom by a carbon atom, R is an organic moiety bound to the silicon atom by a carbon atom, Q is a hydrolyzable ligand selected from the group consisting of chlorine, bromine, iodine, alkoxy, and acyloxy, x is 1, 2, or 3, y is 0, 1, or 2, and the sum of x and y is no greater than 3; and the energy curable organometallic coupling agent including an energy curable organic moiety has the formula $Rd_xR_yMQ_{4-x-y}$ wherein M is a metal atom selected from the group consisting of Si, Ti, Zr, and Sn, Rd is an organic moiety including an energy curable functional group, R is an organic moiety bound to the metal atom by a carbon atom, Q is a hydrolyzable ligand selected from the group consisting of chlorine, bromine, iodine, alkoxy, and acyloxy, x is 1, 2, or 3, y is 0, 1, or 2, and the sum of x and y is no greater than 3.

Another aspect of the present invention relates to a polymeric material including condensed metal oxide nanoparticles having a mixture of organometallic coupling agents covalently bound to the exterior surface of the nanoparticles; and a high refractive index solid polymer matrix, wherein the mixture of organometallic coupling agents includes a high refractive index organometallic coupling agent, and an organometallic coupling agent covalently bound to the polymer matrix; and the condensed metal oxide nanoparticles are homogeneously dispersed in the solid polymer matrix.

Another aspect of the present invention relates to a planar optical device having a waveguide core and a waveguide cladding, wherein at least one of the waveguide core and waveguide cladding are made from the polymeric material of the present invention.

Another aspect of the present invention relates to a thin film optical device having alternating layers of transparent materials with differing refractive indices, wherein at least one of the materials is the polymeric material of the present invention.

Another aspect of the present invention relates to a monolithic optical element including the polymeric material of the present invention.

Another aspect of the present invention relates to a process for making an energy curable composition by reacting condensed metal oxide nanoparticles with a mixture of a high refractive index organometallic coupling agent and an organometallic coupling agent containing an energy curable organic moiety to yield nanoparticles with the mixture of the coupling agents covalently bound to the surface of the nanoparticles; and dispersing the nanoparticles so formed in at least one high refractive index energy curable monomer or oligomer.

Another aspect of the present invention relates to a process for making a polymeric material by reacting condensed metal oxide nanoparticles with a mixture of a high refractive index organometallic coupling agent and an organometallic coupling agent containing an energy curable organic moiety to yield nanoparticles with the mixture of the coupling agents covalently bound to the surface of the nanoparticles; dispersing the nanoparticles so formed in at least one high refractive index energy curable monomer or oligomer; and curing the composition so formed with a source of energy.

Another aspect of the present invention is a process for making an article of manufacture comprising the steps of reacting condensed metal oxide nanoparticles with a high refractive index organometallic coupling agent and an organometallic coupling agent containing an energy curable organic moiety to yield nanoparticles with the coupling agent or agents bound to the surface of the nanoparticles; dispersing the mixture so formed in at least one high refractive index energy curable monomer or oligomer; contacting the composition so formed with a mold surface; curing the composition in contact with the mold with a source of energy; and removing the article so formed from the mold surface.

The materials of the present invention have a high refractive index in the infrared, above about 1.60 at 1550 nm, making them suitable for use in certain devices for optical communication, such as a liquid crystal cross-connect device. Low shrinkage upon cure is observed, and low coefficient of thermal expansion, low thermo-optic coefficient and low birefringence of the polymeric material are expected due to the high inorganic content of these materials. The materials of the present invention may be formulated to have lower optical loss than their wholly organic counterparts due to lower optical loss of the inorganic constituents. The energy curable composition has good wettability, and the polymeric material has good release characteristics from nickel microreplication tools as well as good adhesion to silaceous substrates such as glass, silica, and silicon, making the materials of this invention well suited for use in polymer microreplication processes.

Additional features and advantages of the invention will be set forth in the detailed description which follows, and in part will be readily apparent to those skilled in the art from the written description or recognized by practicing the invention as described in the written description and claims hereof, as well as the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings illustrate one or more embodiment(s) of the invention, and together with the description serve to explain the principles and operation of the invention.

DETAILED DESCRIPTION OF THE INVENTION

The generation of metal oxide nanoparticles in situ in a hybrid material using the traditional sol-gel process involves the hydrolysis and condensation of metal alkoxides. In this process, incomplete condensation and alcohol and water entrapment inside the nanoparticles are often observed. The hydroxyl groups of the entrapped species and of the uncondensed hydroxyls of the nanoparticle absorb strongly around 1550 nm, interfering with optical communication. As a person of skill in the art will appreciate, the extreme heat necessary to fully condense the nanoparticles and remove water and/or alcohols is incompatible with the organic portion of the hybrid material. Further, shrinkage during condensation causes stress-induced cracking of the materials. The present invention obviates the use of the sol-gel process through the use of condensed metal oxide nanoparticles. The condensed metal oxide nanoparticles are fully condensed in their manufacturing process, and have substantially no hydroxyls in their interiors. The use of condensed metal oxide nanoparticles avoids the incomplete condensation and alcohol and water trapping problems frequently encountered in the use of the sol-gel process in organic systems.

Condensed metal oxide nanoparticles for use in the present invention include, for example, titania, zirconia, tin (IV) oxide, cerium (IV) oxide, and mixtures thereof. Preferably, the nanoparticles have a refractive index above about 1.65 at 1550 nm. The nanoparticles may include other compounds, such as silica, in amounts that do not lower the nanoparticle refractive index substantially below about 1.65 at 1550 nm. Condensed metal oxide nanoparticles are available as colloidal suspensions in organic solvents from suppliers such as Nissan Chemical America. For example, HIT-32M, available from Nissan Chemical America, is a 30 wt % suspension of about 5 nm $TiO_2.ZnO_2.SnO_2$ nanoparticles in methanol. These nanoparticles have an exterior surface layer of silanols. Zirconia nanoparticles with an average particle size of between 15 and 30 nm are available from TAL Materials, Inc., of Ann Arbor, Mich. Titania nanoparticles with an average particle size of between 30 and 40 nm are available from Altair Technologies, Inc., of Reno, Nev. In order to provide a material with substantially no scattering loss, condensed metal oxide nanoparticles suitable for use in the present invention should be smaller than the desired operating wavelength. Consequently, for use in optical communication devices, substantially all of the nanoparticles (95%+) should have an average diameter of no greater than 75 nm. Desired nanoparticles have average diameters of about 1 nm to about 50 nm, and especially desirable nanoparticles have average diameters of about 1 nm to about 20 nm. Silica nanoparticles as small as 1 nm have been reported in the research literature. As, and if, they become available commercially, smaller sized condensed silica nanoparticles will likewise be suitable for practicing the present invention.

The exterior surface of the condensed metal oxide nanoparticle is modified with a mixture of organometallic coupling agents. One component of the mixture is a high refractive index organometallic coupling agent. This coupling agent may have the formula $Rc_xR_yMQ_{4-x-y}$ wherein M is a metal atom selected from the group consisting of Si, Ti, Zr, and Sn, Rc is an organic moiety with a refractive index of at least about 1.52 at 1550 nm bound to the metal atom by a carbon atom, R is an organic moiety bound to the metal atom by a carbon atom, Q is a hydrolyzable ligand selected from the group consisting of chlorine, bromine, iodine, alkoxy, and acyloxy, x is 1, 2, or 3, y is 0, 1, or 2, and the sum of x and y is no greater than 3. The organic moiety R may include species such as, for example, a $C_1$ to about $C_{10}$ alkyl, a $C_1$ to about $C_{10}$ aryl, and may include functionalities such as, for example, halogen, ester, ether, amide, amine, ketone, thioether, or urethane. The high refractive index organic moiety Rc imparts a high refractive index to the coupling agent. In general, high refractive index organic species include at least one of the following functionalities: (1) chlorine, bromine, or iodine; (2) sulfur, selenium or phosphorus atom; (3) aromatic ring, or (4) highly conjugated unsaturated system. Suitable high refractive index moieties Rc may include, for example, bromoalkyl and bromoaryl groups; chloroalkyl and chloroaryl groups; aryl and heteroaryl systems; thioether, thioester, sulfoxide, and sulfone functionalities; and phosphine and phosphine oxide functionalities. A coupling agent with a metal atom M having a high refractive index, such as titanium or zirconium, will have a higher refractive index than its silicon based analog. The high refractive index organometallic coupling agent may provide a material with a smooth refractive index gradient between the condensed metal oxide nanoparticles and the somewhat lower refractive index organic portion of the material, and therefore lowers scattering loss. High refractive index coupling agents for use in the present invention include, for example, (bromophenyl) trimethoxysilane, (chlorophenyl)trimethoxysilane, triphenylethoxysilane, diphenyldimethoxysilane, and 3,4,5, 6,7,7-hexachloro-2-(triethoxysilyl)bicyclo[2.2.1]heptane, and similar high refractive index organometallic coupling agents.

In an alternative embodiment of the invention, the high refractive index coupling agent is an organometallic coupling agent with a high refractive index metal atom, such as, for example, titanium, tin or zirconium. For example, the high refractive index organometallic coupling agent may be one of the zirconate or titanate coupling agents available from Kenrich Petrochemicals, of Bayonne, N.J. Exemplary high refractive index organometallic coupling agents for use in this invention include dineopentyl(diallyl)oxy, di(3-mercapto)propionic zirconate (NZ 66A); neopentyl(diallyl) oxy, trimethacryl zirconate (NZ 33); alkoxy trimethacryl titanate (KR 33DS); and alkoxy triacryl titanate (KR39DS), and similar energy curable titanates and zirconates, all available from Kenrich Petrochemicals, Inc., of Bayonne, N.J. Note that the high refractive index organometallic coupling agent may have energy curable moieties.

Another component of the mixture of organometallic coupling agents is an organometallic coupling agent containing an energy curable moiety. This coupling agent may have the formula $Rd_xR_yMQ_{4-x-y}$ wherein M is a metal atom selected from the group consisting of Si, Ti, Zr, and Sn, Rd is an organic moiety including an energy curable functional group, R is an organic moiety bound to the metal atom by a carbon atom, Q is a hydrolyzable ligand selected from the group consisting of chlorine, bromine, iodine, alkoxy, and acyloxy, x is 1, 2, or 3, y is 0, 1, or 2, and the sum of x and y is no greater than 3. The organic moiety R may include species such as, for example, a $C_1$ to about $C_{10}$ alkyl, a $C_1$ to about $C_{10}$ aryl, and may include functionalities such as, for example, halogen, ester, ether, amide, amine, ketone, thioether, or urethane. The energy curable functional group may be, for example, an ethylenically unsaturated group, an epoxide, or a thiol. Desirable energy curable functional groups may include, for example, acrylates, methacrylates, alkenes, maleimides, styrenes, vinyl ethers, epoxides and thiols. The organic moiety Rd may include other functionalities, such as, for example, alkylene, arylene, ester, ether, ketone, amine, amide, urethane, thioether, and thiol. The energy curable functional group of the coupling agent is chosen to be copolymerizable with the high refractive index monomer or oligomer. Coupling agents containing energy curable moieties for use herein include, for example, (3-methacryloxypropyl)trimethoxysilane; (3-methacryloxypropyl)dimethylmethoxysilane; (3-acryloxypropyl)trimethoxysilane; vinyltrimethoxysilane; (3-glycidyloxypropyl)triethoxysilane; allyltrimethoxysilane; and styrylethyltrimethoxysilane; dineopentyl(diallyl) oxy, di(3-mercapto)propionic zirconate (NZ 66A); neopentyl(diallyl)oxy, trimethacryl zirconate (NZ 33); alkoxy trimethacryl titanate (KR 33DS); alkoxy triacryl titanate (KR39DS) and similar energy curable organometallic coupling agents.

It is to be noted that in some cases, the same compound may serve as the high refractive index organometallic coupling agent and the energy curable organometallic coupling agent. For example, compounds such as neopentyl(diallyl) oxy, trimethacryl zirconate (NZ 33) and alkoxy trimethacryl titanate have both a high refractive index metal atom and an energy curable moiety. As the skilled artisan will appreciate, use of a single compound as both high refractive index organometallic coupling agent and energy curable organometallic coupling agent may sometimes be advantageous.

The surface modification by the mixture of organometallic coupling agents changes the surface of the nanoparticles from hydrophilic to hydrophobic, thus allowing the inorganic nanoparticles to be compatible with organic media, such as, for example, a mixture of monomers or oligomers, or a polymer matrix. The organometallic coupling agents are attached to the metal oxide nanoparticle surface through metal-oxygen-metal covalent bonds, which may be formed by reactions, such as hydrolysis and condensation reactions, as described below and known to one of ordinary skill in the art. In the coupling reactions, at least one hydrolyzable ligand Q of the coupling agent are replaced by a surface hydroxyl of the condensed metal oxide nanoparticle, forming a metal-oxygen-metal bond and forming a molecule of Q-H.

The organic portion of the energy curable composition includes one or more high refractive index monomers or oligomers. High refractive index monomers and oligomers are defined for use herein as substances with an energy curable moiety and high refractive index moiety. Suitable high refractive index monomers and oligomers have a refractive index of greater than about 1.52 at 1550 nm. Desirable high refractive index monomers and oligomers have a refractive index of greater than about 1.56 at 1550 nm. Especially desirable high refractive index monomers and oligomers have a refractive index of greater than 1.60 at 1550 nm. For example, high refractive index monomers and oligomers may include at least one of the following functionalities: (1) chlorine, bromine, or iodine; (2) sulfur, selenium or phosphorus atom; (3) aromatic ring, or (4) highly conjugated unsaturated system. The energy curable monomer or oligomer also includes a energy curable functionality chosen to be copolymerizable with the energy curable moiety of the energy curable organometallic coupling agent. Examples of such energy curable functionalities include acrylate, methacrylate, vinyl ether, alkene, allyl ether, styryl, maleimide, thioacrylate, thiomethacrylate, vinyl thioether, and allyl thioether.

Specific monomers that may be used in the present invention include, for example, pentachlorobenzyl methacrylate; pentabromophenyl acrylate; pentachlorophenyl acrylate; 1,4,5,6,7,7-hexachlorobicyclo[2.2.1]hept-5-en-2-yl acrylate; pentachlorostyrene; vinyl napthalene, divinylbenzene, 2-vinylthiophene, vinyl phenyl sulfide, o-chlorobenzyl methacrylate, styrene, diallyl phthalate, bis (4-methacryloylthiophenyl) sulfide, 1,4-di (methacryloylthio)benzene, N-vinylcaprolactam, phenyl vinyl sulfoxide, N-vinyl pyrrolidinone, ethoxylated bisphenol A diacrylate, ethoxylated bisphenol A dimethacrylate, N-acryloyl morpholine, and similar monomers.

Specific oligomers that may be used in the present invention include, for example, the capped oligomeric thioethers described in commonly owned and copending U.S. patent application Ser. No. 09/684,953, entitled "High Refractive Index Waveguide Polymers," which is incorporated herein by reference. An exemplary oligomer for use in the present invention is the methacrylate capped oligomeric thioether given as structure I, below.

(I)

As will be appreciated by a person of skill in the art, high refractive index monomers and oligomers may be used in combination with other monomers and oligomers to lend the desired properties to the energy curable composition or to the polymer derived therefrom. In general, desirable monomers and oligomers are selected to have a high refractive index. Monomers and oligomers are chosen which will copolymerize with the energy curable moieties of the energy curable organometallic coupling agent, and which will be compatible with the energy curable composition.

Figure 1:
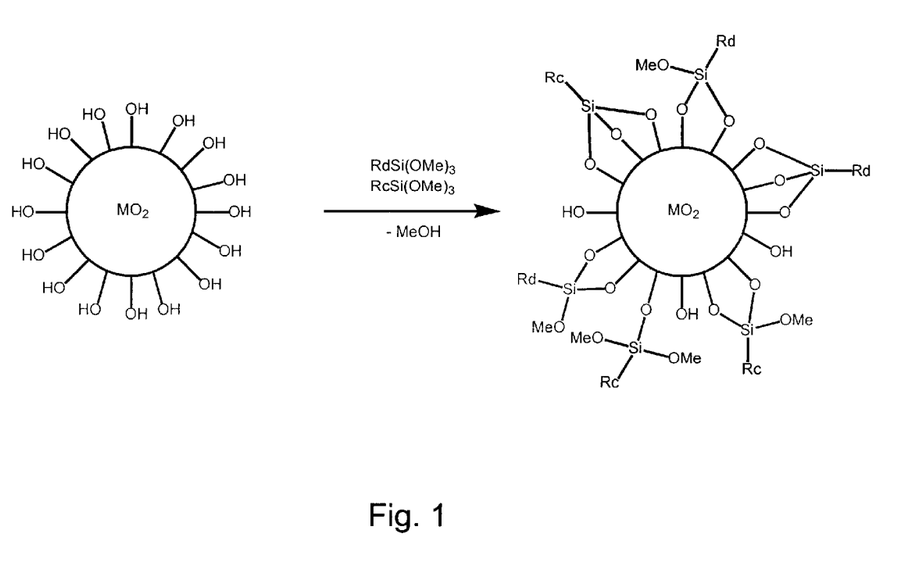
FIG. 1 is a diagram of the surface functionalization of metal oxide nanoparticles by a mixture of organometallic coupling agents.

The desired condensed metal oxide nanoparticles, high refractive index coupling agents, energy curable organometallic coupling agents, and high refractive index energy curable monomers and oligomers must be formulated into an energy curable composition in a manner such that the nanoparticles do not agglomerate and do become well-dispersed in the composition. In an exemplary embodiment of the invention, condensed metal oxide nanoparticles are first reacted with a mixture of a high refractive index organometallic coupling agent and an energy curable organometallic coupling agent, thereby functionalizing the surfaces of the nanoparticles with the coupling agents and converting them from hydrophilic to organophilic, as shown in FIG. 1. For example, if the surface of the condensed metal oxide nanoparticles are functionalized with a mixture of (3-methacryloxypropyl)trimethoxysilane and (bromophenyl)trimethoxysilane, a (3-methacryloxypropyl)silane species and a (bromophenyl)silane species will be covalently bound to the surface of the nanoparticles. While the coupling agent is shown as a monolayer in FIG. 1, the skilled artisan will recognize that it may be deposited in a multilayer network, depending on reaction conditions.

After treatment with the coupling agents, the nanoparticles are then dispersed in the high refractive index energy curable monomers or oligomers. As the surfaces of the nanoparticles are organophilic, they are highly soluble in the monomers or oligomers, and do not agglomerate significantly as indicated by light scattering measurements. As noted above, the condensed metal oxide nanoparticles are generally available as a colloidal suspension in an organic solvent. At some point in the formulation process, the organic solvent may be removed by, for example, rotary evaporation. In order to remove particulate matter which would cause scattering losses in the eventual polymer, it is desirable to filter the formulated energy curable composition through a filter of a porosity suitable to remove particulate matter while allowing the functionalized nanoparticles to pass through. For example, a 0.2 μm filter has been used in the Examples disclosed herein.

To enhance the rate of cure of the energy curable composition, a polymerization initiator may be added. The choice of the polymerization initiator will depend upon the identities of the curable moieties of the monomers or oligomers and the energy curable organometallic coupling agent. Any thermal initiator or photoinitiator known to polymerize the particular curable moieties of the energy curable composition may be used. The initiator may be present in an amount of from about 0.01% to about 10% by weight of the overall composition, and more suitably from about 0.1% to about 5%. The initiator is suitably chosen to be thermally inactive near room temperature (e.g. below about 50° C.). For example, if the curable moieties are, for example, epoxides or vinyl ethers, a cationic initiator, such as Sarcat® SR1010, a 50% solution of triarylsulfonium hexafluoroantimonate in propylene carbonate; Sarcat SR1011, a 50% solution of triarylsulfonium phosphate in propylene carbonate; or Sarcat SR1012, a diaryliodonium hexafluoroantimonate (all available from Sartomer, of Exton, Pa.), may be used. If the curable moieties are, for example, acrylates, methacrylates, maleimides, styrenes or alkenes, a free radical initiator, such as ESACURE® KTO46 (a blend of phosphine oxide, α-hydroxy ketone and a benzophenone derivative available from Sartomer, of Exton, Pa.); 2-hydroxy-2-methyl-1-phenylpropan-1-one; benzodimethyl ketal; 1-hydroxycyclohexyl phenyl ketone; benzoyl peroxide; and 1,1'-azobis(cyclohexanecarbonitrile). If the thiol-ene reaction, which is well-understood in the art, is to be used at least in part as the polymerization mechanism, both thiol moieties and ethylenically unsaturated moieties must exist in the composition, either in the energy curable coupling agent, the monomers or oligomers, or both. In the case of such thiol-ene systems, a free radical initiator may be used.

Other additives may also be added to the energy curable compositions depending on the purpose and the end use of the compositions. Examples of these include solvents, monomers or oligomers of refractive index lower than about 1.52 at 1550 nm, antioxidants, photostabilizers, volume expanders, dyes, free radical scavengers, contrast enhancers, nitrones and UV absorbers known to those of skill in the art. Solvents, such as cyclohexanone, methyl ethyl ketone, and propylene glycol methyl ether acetate, and lower refractive index monomers or oligomers may be used to modify the properties of the energy curable composition and the polymer derived therefrom, as is appreciated by the skilled artisan. Antioxidants include such compounds as phenols and particularly hindered phenols including Irganox® 1010 from Ciba Additives of Tarrytown, N.Y. ; sulfides; organoboron compounds; organophosphorous compounds; and N,N'-hexamethylenebis(3,5-di-tert-butyl-4-hydroxyhydrocinnamamide), available from Ciba Additives under the trade name Irganox 1098. Photostabilizers, and more particularly hindered amine light stabilizers, include but are not limited to poly[(6-morpholino-s-triazine-2,4- diyl)[(2,2,6,6,-tetramethyl-4-piperidyl)imino]-hexamethylene[(2,2,6,6,-tetramethyl-4-piperidyl)imino]] available from Cytec Industries of Wilmington, Del. under the tradename Cyasorb® UV-3346. Volume expanding compounds include such materials as the spiral monomers known as Bailey's monomer. Examples of dyes include methylene green, methylene blue, and the like. Suitable free radical scavengers include oxygen, hindered amine light stabilizers, hindered phenols, 2,2,6,6-tetramethyl-1-piperidinyloxy free radical (TEMPO), and the like. Suitable contrast enhancers include other free radical scavengers such as nitrones. UV absorbers include benzotriazole, hydroxybenzophenone, and the like. Each of these additives may be included in quantities up to about 6%, based upon the total weight of the composition, and usually from about 0.1% to about 1%.

The formulated energy curable composition thus includes metal oxide nanoparticles which have been surface-functionalized with a mixture of the coupling agents, and thus are coated with an organic layer that is of high refractive index and contains energy curable moieties. The energy curable composition also includes high refractive index monomers or oligomers, and any excess organometallic coupling agents not consumed in the surface functionalization reaction. The metal oxide nanoparticles are well-dispersed in the energy curable composition, exhibiting substantially no agglomeration. The composition may also include other species, such as polymerization initiators, additives, solvents, and lower refractive index monomers or oligomers.

The energy curable composition may be cured with an appropriate source of energy. For example, compositions formulated with a thermal initiator may be polymerized by the application of heat. Polymerization temperature depends on the thermal initiator used and usually ranges from about 60° C. to about 200° C., with temperatures between 70° C. and 100° C. being preferred. Thermal polymerization times may vary from several seconds to several hours, depending on the temperature and initiator used.

Compositions formulated with a photoinitiator may be polymerized by exposure to actinic radiation, defined as light in the visible, ultraviolet, or infrared regions of the spectrum, as well as electron beam, ion or neutron beam, or X-ray radiation. Actinic radiation may be in the form of incoherent light or coherent light, for example, from a laser. Sources of actinic light and exposure procedures, times, wavelengths and intensities may vary widely depending on the desired degree of polymerization, the index of refraction of the material, and other factors known to those of ordinary skill in the art. Such conventional photopolymerization processes and their operational parameters are well known in the art. Sources of actinic radiation and the wavelength of the radiation may vary widely, and any conventional wavelength and source can be used. It is preferable that the photoinitiator require that photochemical excitation be carried out with relatively short wavelength (high energy) radiation, so that exposure to radiation normally encountered before processing (e.g. room lights) will not prematurely polymerize the energy curable composition. Thus, exposure to ultraviolet light or deep ultraviolet light are useful. Convenient sources include high pressure xenon or mercury-xenon arc lamps filled with appropriate optical filters to select the desired wavelengths for processing. Short wavelength coherent radiation is useful for the practice of this invention. Thus, use of an argon ion laser operating in the UV mode at several wavelengths near 350 nm or a frequency-doubled argon ion laser with an output near 257 nm wavelength is highly desirable. Electron beam or ion beam excitation may also be used. Alternatively, the processing can utilize a multiphoton process initiated by a high intensity source of actinic radiation, such as a laser. Typical exposure times vary from a few tenths of seconds to about several minutes depending on the actinic source. Photopolymerization temperatures usually range from about 10° C. to about 60° C., with room temperature (18–27° C.) being preferred.

Figure 2:
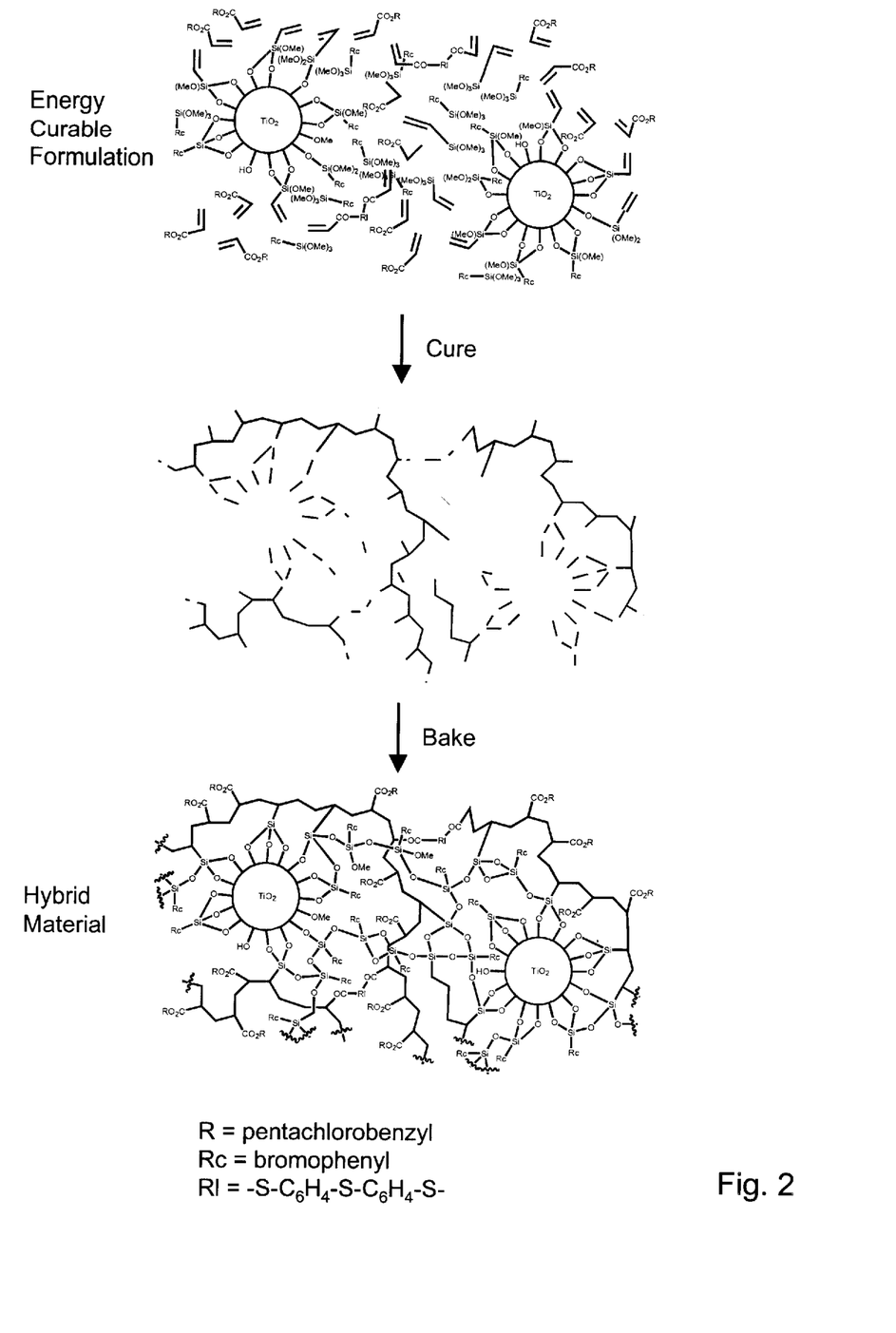
FIG. 2 is a diagram of the polymerization of an energy curable composition of the present invention to yield a hybrid material of the present invention.

FIG. 2 is a diagram showing the polymerization of an exemplary energy curable composition on a molecular level. In FIG. 2, the high refractive index organometallic coupling agent is (bromophenyl)trimethoxysilane, the energy curable coupling agent is vinyltrimethoxysilane, and the high refractive index monomers are bis(4-methacryloylthiophenyl) sulfide and pentachlorobenzyl methacrylate. Thus, in FIG. 2, Rc is bromophenyl; R is pentachlorobenzyl; and R1 is —S—$C_6H_4$—S—$C_6H_4$—S—. In the curing process, the energy curable moieties of the monomers, oligomers, the surface-functionalized nanoparticles, and the excess energy curable coupling agent polymerize to form a high refractive index polymer matrix. The nanoparticles and the excess energy curable coupling agent thus become covalently bound to the polymer matrix. The metallic portion of the excess energy curable coupling agent and the excess high refractive index coupling agent remain essentially unreacted and distributed throughout the high refractive index polymer matrix. The material is then baked, preferably at a temperature between 120° C. and 250° C. During the baking, the metallic portions of the excess energy curable coupling agent and of the excess high refractive index coupling agent condense with themselves, each other, and any unreacted hydroxyls remaining on the nanoparticles to form an inorganic network. An advantage of the process of the present invention is that dehydration and dehydroxylation during the baking step is facile due to the highly hydrophobic properties of the materials. As each metal atom in the network is bound to an organic moiety as well as up to three other metal atoms through metal-oxygen-metal bonds, this type of network is an organically modified inorganic network. The organically modified inorganic network and the polymer network are covalently bound and substantially intermingled with each other, and are thus considered to be bicontinuous with one another.

The copolymerization of the energy curable moieties and the condensation of the coupling agents causes a high degree of interpenetration between the organic and the inorganic networks, providing for a highly homogeneous material. As a result of this interpenetration and the high inorganic content of the material, low shrinkage during curing was observed, and a low coefficient of thermal expansion and low thermo-optic coefficient are expected. Moreover, the process of the present invention reduces the capillary pressure effects and the shrinkage-induced stress that is experienced in the use of the sol-gel process. The polymeric materials of the present invention may be formed into articles of over about five microns, over about fifteen microns, over about 100 microns, and even over about 2 millimeters in thickness without exhibiting significant cracking. In contrast to the present invention, crack-free films of only up to about five microns in thickness may be made using the sol-gel process.

When cured in contact with a mold surface, the compositions of the present invention retain the shape of the mold, and thus are suitable for use in known polymer casting and molding processes. For example, the compositions of the present invention may be used in a UV embossing microreplication process. A detailed discussion of the UV embossing microreplication process may be found in commonly held and copending U.S. patent application Ser. No. 09/337,026, which is incorporated herein by reference. In this process, UV-curable liquid compositions are applied to a transparent substrate, then an embossing tool containing a surface relief pattern is applied to the liquid composition. The tool may be made, for example, from nickel by electroforming from a photoresist-on-silicon master. Generally, the tool is mounted on a cylindrical drum, and the drum rolled across the liquid composition. The UV-curable liquid is cured to a polymer with actinic radiation, such as ultraviolet radiation, by directing the radiation through the transparent substrate to cure the composition while in contact with the tool. The tool is then pulled (e.g. by rolling) away from the cured polymer leaving the inverse of the surface relief pattern of the tool in the cured polymer composition. In order to be suitable for this process, the composition must be UV curable and have a rate of cure sufficient to retain the fine structure of the embossing tool; must adhere to the substrate upon curing; and must release from (i.e. not adhere to) the tool after curing. Good release is necessary to ensure duplication of the smoothness and surface relief of the embossing tool.

The compositions of the present invention release well from standard embossing tools. Though they do not adhere to embossing tools, the compositions of the present invention do adhere well to glass substrates because the organometallic coupling agents of the formulation can make covalent bonds to silanol groups on the surface of the glass. The compositions of the present invention likewise have low volume shrinkage upon cure, allowing for precise transfer of the surface relief pattern of the tool to the cured polymer. The materials of the present invention are also suitable for use in other forming processes, such as standard photolithograpy/etching processes, and cast-and-cure.

Figure 3:
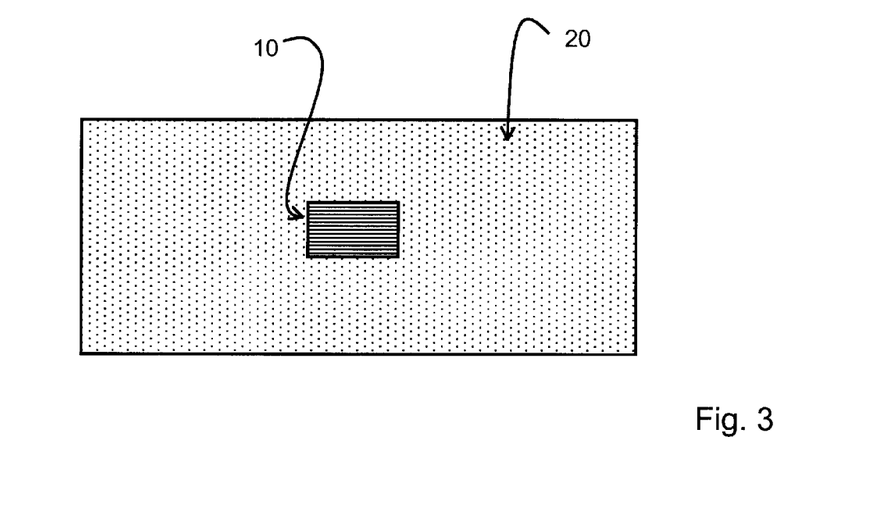
FIG. 3 is a side view of a waveguide of the present invention.
Figure 4:
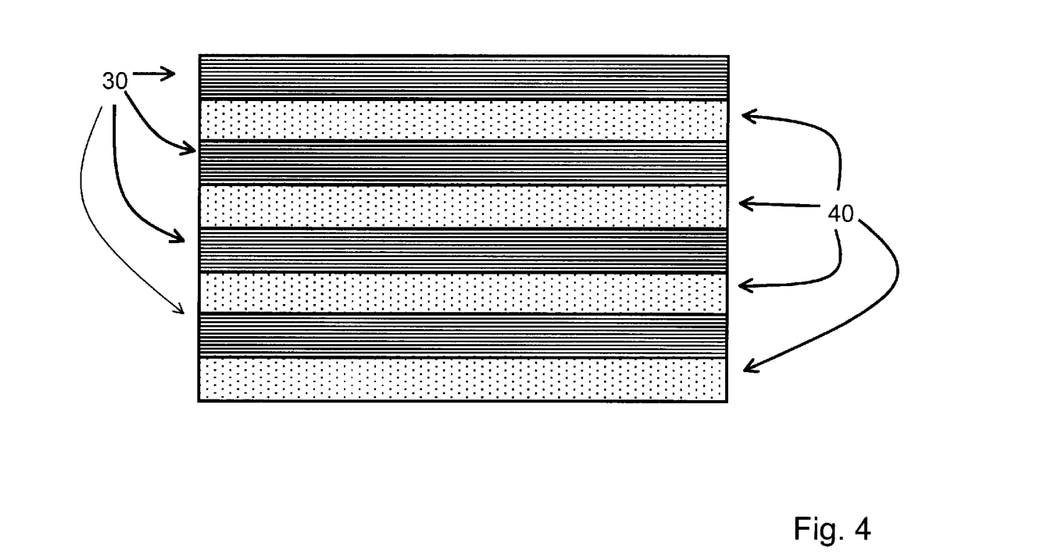
FIG. 4 is a side view of an interference filter of the present invention.

The compositions of the present invention have good processing characteristics and low optical loss, and are therefore suitable for use in the manufacture of optical elements for use in devices. For example, the UV embossing process detailed above may be used to create planar waveguides using the inventive compositions. An exemplary planar waveguide structure is shown in FIG. 3. The planar waveguide includes a waveguide core 10 and a waveguide cladding 20. At least one of the core and the cladding may be the polymeric material of the present invention. In another exemplary embodiment, the materials of the present invention may be used to create a thin film interference filter, as shown in FIG. 4. The exemplary filter of FIG. 4 includes layers 30 and 40 of two materials of differing refractive index; one of these materials may be in accordance with the invention disclosed herein. In a third exemplary embodiment, the compositions of the present invention may be cast into an appropriate mold to give a bulk optical element, such as, for example, a lens, a prism, or a window. The person of skill in the art will recognize that the present invention may be adapted for use in the construction of a wide variety of elements and devices.

The materials and processes of the present invention can best be understood by reference to the following examples, each of which illustrates an embodiment of the present invention. While each of these embodiments illustrate the present invention, they should not be construed in any way as limiting its scope.

EXAMPLE 1

In a 500 mL round-bottomed flask, 13.86 g (bromophenyl)trimethoxysilane was dissolved in 200 mL tetrahydrofuran with magnetic stirring. 3.0 g of 3.7% aqueous HCl was added dropwise, and the silane solution was allowed to hydrolyze for 30 minutes.

In a 500 mL round-bottomed flask, 37.42 g of HIT-32M was dissolved in 200 mL of methanol. With magnetic stirring, 39.12 g of the hydrolyzed silane solution described above was added over the course of two hours. After the resultant solution was allowed to stir overnight, 5.0 g of (3-methacryloxypropyl)trimethoxysilane was added dropwise, and the mixture was allowed to stir for three hours. The mixture was then concentrated by half by rotary evaporation at 40° C. and 200 mbar, yielding a translucent viscous sol, which was left open to the atmosphere on the bench overnight to allow further evaporation of solvent.

In a 20 mL beaker, 3.2 g of bis(4-methacryloylthiophenyl) sulfide, available from TCI America, was dissolved in 10 mL of the hydrolyzed silane solution described above. This was added dropwise to the sol described above, and the mixture allowed to stir for two hours. The solvent was evaporated by rotary evaporation at 30° C. and 300–350 mbar, yielding a translucent liquid.

Into 2.5 g of this liquid was dissolved 0.002 g KTO-46 photoinitiator, available from Sartomer, of Exton, Pa. The mixture was drawn down to a film onto a glass substrate using a 0.0005" Bird applicator. The film was cured under nitrogen by two passes at 20 mm/sec under a Fusion Systems F-450 300 W/in "D" lamp. The UV dose at this speed was 5.56 J/cm2 per pass as measured by an International Light IL-390B radiometer. The film was postbaked in a temperature programmable vacuum oven (30° C.–150° C. over 4 hours; 150° C. for 3 hours; 150° C.–25° C. over 4 hours).

The cured film was about 10 microns thick, and was transparent. The film had a refractive index of 1.736 at a wavelength of 633 nm, 1.702 at 1300 nm, and 1.700 at 1541 run. The film survived two weeks at 85° C. and 85% relative humidity with about a +0.002 change in refractive index. This may be due to further densification of the film.

EXAMPLE 2

In a 250 mL round-bottomed flask, 0.504 g (bromophenyl)trimethoxysilane, 39.7 g HIT-32M, and 50.5 g methanol were combined and stirred with a magnetic stirrer to yield a sol. A solution of 0.062 g of NZ 33 in 46.5 g of methanol was added dropwise to the sol, and the resulting solution allowed to stir for half an hour. The solution was concentrated by one half by rotary evaporation at 30° C. and 210–250 mbar. To the evaporated mixture was added dropwise a solution of 3.722 g of bis(4-methacryloylthiophenyl)sulfide in 3.1 g of cyclohexanol and 1.0 g of dimethyl sulfoxide. The mixture was allowed to stir for two hours.

A sample of 2.227 g of the mixture and 0.035 g KTO-46 was drawn down and cured as described in connection with Example 1. The cured film was about 10 microns thick, and was transparent. The film had a refractive index of 1.796 at a wavelength of 633 nm, 1.755 at 1300 nm, and 1.753 at 1541 nm.

EXAMPLE 3

A 500 mL round-bottomed flask was charged with 34.768 g HIT-32M. To the sol was added dropwise 0.525 g of (3-methacryloxypropyl)trimethoxysilane, and the mixture was stirred for three hours. To this mixture was added dropwise 0.105 g of KR 33DS, and the mixture was stirred for one and a half hours. To this mixture was added dropwise 0.105 g dimethyldimethoxysilane, and the mixture was allowed to stir overnight to yield a functionalized sol.

In a 50 mL beaker were combined 11.273 g bis(4-methacryloylthiophenyl)sulfide, 7.515 g phenyl vinyl sulfoxide, 5.636 g ethoxylated bisphenol A diacrylate (SR349 from Sartomer Co.), 5.5 g 1-methyl 2-pyrrolidinone, 1.0 g 1-vinyl-2-pyrrolidinone, and 3.6 g tetrahydrofuran. The mixture was magnetically stirred for two hours, then added dropwise with stirring to the functionalized sol described above. The mixture was concentrated by rotary evaporation at 30° C. and 250 mbar, and 10 g 1-propanol was added, and the mixture was stirred for two hours. KTO-46 (0.98 g) was added, and the solvent was evaporated by rotary evaporation at 30° C. and 70–250 mbar.

The resultant mixture contained about 10% solvent, and was a slightly yellow, translucent liquid with a viscosity between 100 and 200 cPs (0.1–0.2 Pa·s). The material worked well in a microreplication process, transferring completely from nickel tooling and adhering well to glass substrates. Films up to 24 microns thick were fabricated, and exhibited no cracking upon postbake at 150° C. Microreplicated samples had surface roughnesses of below 20 nm.

A sample of the mixture was drawn down and cured as described in connection with Example 1. The cured film was about 10 microns thick, and was transparent. The film had a refractive index of 1.711 at a wavelength of 633 nm, 1.685 at 1300 nm, and 1.678 at 1541 nm.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

We claim:

1. A polymeric material comprising:
   condensed metal oxide nanoparticles having a mixture of organometallic coupling agents covalently bound to the exterior surface of the nanoparticles; and
   a high refractive index solid polymer matrix, wherein the mixture of organometallic coupling agents includes a high refractive index organometallic coupling agent, and an organometallic coupling agent covalently bound to the polymer matrix; and the condensed metal oxide nanoparticles are homogeneously dispersed in the solid polymer matrix.

2. The polymeric material of claim 1 wherein substantially all the condensed metal oxide nanoparticles are less than about 75 nm in diameter.

3. The polymeric material of claim 1 wherein the condensed metal oxide nanoparticles are in the range of about 1 to about 50 nm in diameter.

4. The polymeric material of claim 1 further comprising a high refractive index organically modified inorganic network bicontinuous with the polymer matrix and covalently bound to the polymer matrix through an organometallic coupling agent.

5. The polymeric material of claim 1 wherein the high refractive index solid polymer matrix is a copolymer of bis(4-methacryloylthiophenyl) sulfide.

6. The polymeric material of claim 1 wherein the mixture of coupling agents includes a species selected from the group consisting of (bromophenyl)silane, (chlorophenyl)silane, diphenylsilane, and phenylsilane.

7. The polymeric material of claim 1 wherein the mixture of coupling agents includes a titanate coupling agent or a zirconate coupling agent.

8. The polymeric material of claim 1 further comprising a refractive index of at least about 1.65 at 1550 nm.

9. The polymeric material of claim 1 further comprising a refractive index of at least about 1.70 at 1550 nm.

10. The polymeric material of claim 1 the polymeric material is the cured product of an energy curable composition comprising
    condensed high refractive index metal oxide nanoparticles;
    a high refractive index organometallic coupling agent;
    an energy curable organometallic coupling agent including an energy curable organic moiety; and
    a high refractive index energy curable organic monomer or oligomer.

11. The polymeric material of claim 10 wherein the condensed high refractive index metal oxide nanoparticles have a refractive index of at least about 1.65 at 1550 nm, and the high refractive index energy curable monomer or oligomer has a refractive index of at least about 1.52 at 1550 nm.

12. The polymeric material of claim 11 wherein:
    the high refractive index organometallic coupling agent has the formula $Rc_xR_yMQ_{4-x-y}$ wherein
    M is a metal atom selected from the group consisting of Si, Ti, Zr, and Sn,
    Rc is an organic moiety with a refractive index of at least about 1.52 at 1550 nm bound to the silicon atom by a carbon atom,
    R is an organic moiety bound to the silicon atom by a carbon atom,
    Q is a hydrolyzable ligand selected from the group consisting of chlorine, bromine, iodine, alkoxy, and acyloxy,
    x is 1, 2, or 3,
    y is 0, 1, or 2, and
    the sum of x and y is no greater than 3; and
    the energy curable organometallic coupling agent includes an energy curable organic moiety has the formula $Rd_xR_yMQ_{4-x-y}$ wherein
    M is a metal atom selected from the group consisting of Si, Ti, Zr, and Sn,
    Rd is an organic moiety including an energy curable functional group,
    R is an organic moiety bound to the metal atom by a carbon atom,
    Q is a hydrolyzable ligand selected from the group consisting of chlorine, bromine, iodine, alkoxy, and acyloxy,
    x is 1, 2, or 3,
    y is 0, 1, or 2, and
    the sum of x and y is no greater than 3.

13. The polymeric material of claim 11 wherein the high refractive index organometallic coupling agent includes a metal atom selected from the group consisting of Ti, Sn and Zr; and the energy curable organometallic coupling agent including an energy curable organic moiety has the formula $Rd_xR_yMQ_{4-x-y}$ wherein
    M is a metal atom selected from the group consisting of Si, Ti, Zr, and Sn,
    Rd is an organic moiety including an energy curable functional group,
    R is an organic moiety bound to the metal atom by a carbon atom,
    Q is a hydrolyzable ligand selected from the group consisting of chlorine, bromine, iodine, alkoxy, and acyloxy, x is 1, 2, or 3, y is 0, 1, or 2, and the sum of x and y is no greater than 3.

14. The polymeric material of claim 10 wherein the high refractive index organometallic coupling agent includes a bromophenyl moiety or a chlorophenyl moiety.

15. The polymeric material of claim 10 wherein the high refractive index organometallic coupling agent includes a plurality f phenyl moieties.

16. The polymeric material of claim 10 wherein the high refractive index organometallic coupling agent is selected from the group consisting of (bromophenyl)trialkoxysilane; (chlorophenyl)trialkoxysilane; diphenyldialkoxysilane; phenyltrialkoxysilane; dineopentyl(diallyl)oxy, di(3-mercapto)propionic zirconate; neopentyl(diallyl)oxy, trimethacryl zirconate; alkoxy trimethacryl titanate; and alkoxy triacryl titanate.

17. The polymeric material of claim 10 wherein the energy curable organometallic coupling agent includes an energy curable organic moiety which is ethylenically unsaturated.

18. The polymeric material of claim 10 wherein the energy curable moiety of the energy curable organometallic coupling agent includes a thiol.

19. The polymeric material of claim 10 wherein the energy curable anometallic coupling agent is selected from the group consisting of 3-(methacryloxypropyl)-trimethoxysilane; di(3-mercapto)propionic zirconate; neopentyl(diallyl)oxy, trimethacryl zirconate; alkoxy trimethacryl titanate; and alkoxy triacryl titanate.

20. The polymeric material of claim 10 wherein the high refractive index energy curable monomer or oligomer is selected from the group consisting of chlorinated monomers, chlorinated oligomers, brominated monomers, brominated oligomers, sulfur-containing monomers, sulfur-containing oligomers, aromatic monomers, and aromatic oligomers.

21. The polymeric material of claim 10 wherein the high refractive index energy curable monomer or oligomer is selected from the group consisting of bis(4-methacryloylthiophenyl) sulfide; phenyl vinyl sufoxide; N-vinyl pyrrolidinone; and 3,4,5,6,7,7-hexachlorobicylo[2.2.1]hept-2-yl acrylate.

22. The polymeric material of claim 10 wherein substantially all the condensed metal oxide nanoparticles are less than about 75 nm in diameter.

23. The polymeric material of claim 10 wherein the condensed metal oxide nanoparticles are in the range of about 1 to about 50 nm in diameter.

24. The polymeric material of claim 10 wherein the condensed metal oxide nanoparticles are in the range of about 1 to about 20 nm in diameter.

* * * * *